Dec. 17, 1968   G. M. JONES   3,416,645
LATERAL BEND CONVEYOR SYSTEM
Filed May 15, 1967   2 Sheets-Sheet 1

INVENTOR
Grady M. Jones
BY *Charles F. Steininger*
ATTORNEY

Dec. 17, 1968  G. M. JONES  3,416,645
LATERAL BEND CONVEYOR SYSTEM
Filed May 15, 1967  2 Sheets-Sheet 2
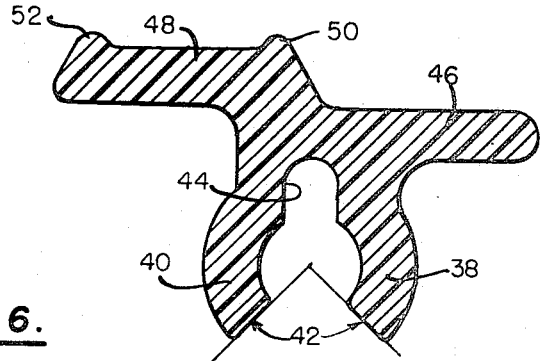
FIG. 4.
FIG. 6.
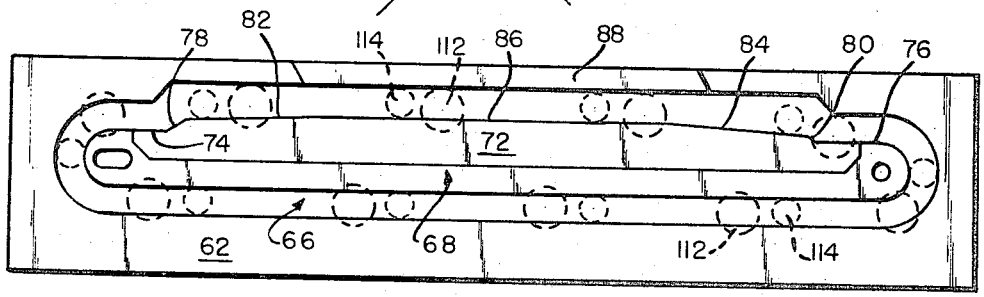
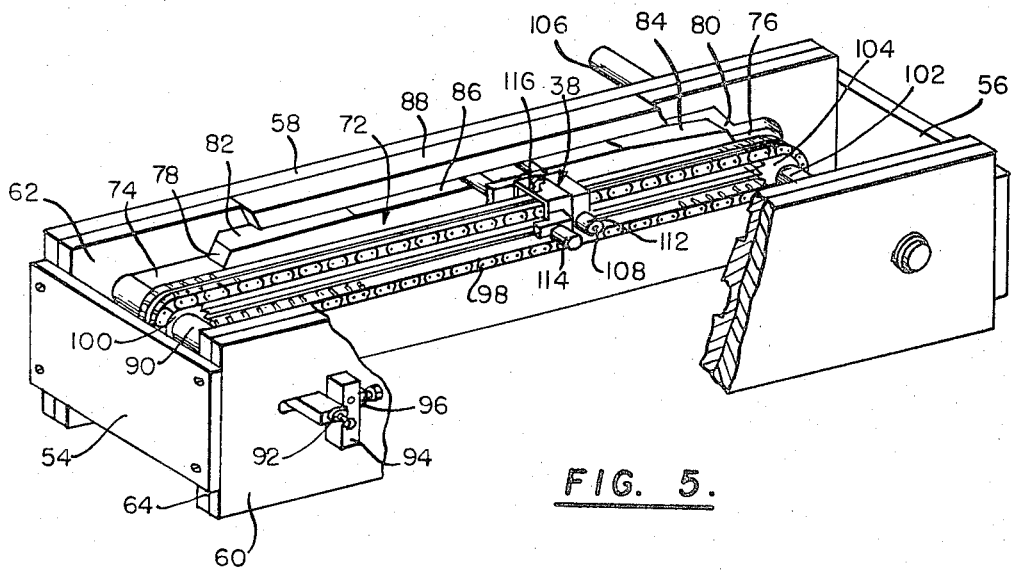
FIG. 5.
INVENTOR
Grady M. Jones
BY Charles F. Steininger
ATTORNEY

United States Patent Office 3,416,645
Patented Dec. 17, 1968

3,416,645
LATERAL BEND CONVEYOR SYSTEM
Grady M. Jones, 2115 Bolden Road, Irving, Tex. 75060
Filed May 15, 1967, Ser. No. 638,332
9 Claims. (Cl. 198—181)

ABSTRACT OF THE DISCLOSURE

The conveyor system described herein includes a uniplanar or superposed run system having at least one lateral bend or turn therein, which includes a metal collapsible conveyor belt, extruded, plastic slat-type coverings for the metal belt having longitudinal traction ribs formed on the upper surfaces thereof, a multiplane side profile adapted to permit overlapping of adjacent slats and a generally centrally positioned annular clamp on the lower surface adapted to snap over transverse rounded rods of the collapsible belt; and at least two synchronized driving devices, including a driven drive chain carrying a plurality of drive dogs, pivoted on cross-members of the chain adjacent the forward portion of the dogs, the dogs having forward cam rollers mounted on the pivots of the dogs, rearward cam rollers mounted adjacent the trailing ends of the dogs, an intermediate upstanding pusher element adapted to engage the transverse rods of the collapsible belt and push the same along a horizontal path, and a co-operating cam of generally-elliptical shape corresponding to the shape of the drive chain but configured along its upper edge to hold the trailing cam rollers in a position whereby the pushing elements of at least two of the driving dogs are in contact with and driving at least two respective, transverse rods of the belt at all times, and whereby the pusher elements are locked into contact and out of contact with the transverse rods of the belt in an arcuate movement.

BACKGROUND OF THE INVENTION

Field of the invention

The conveyor system of the present invention relates to a collapsible conveyor belt formed in an endless closed loop and following either a uniplanar or superposed run configuration with at least one lateral bend or turn in one of such runs; a slated-type cover structure for the endless belt and at least two synchronized driving devices for positively driving the belt from the underside thereof.

Description of the prior art

There are a number of metallic conveyor belts presently marketed and described in the prior art which are collapsible and accordingly adapted to form a closed loop of uniplanar or superposed runs having lateral bends in such runs. These belts may comprise a plurality of parallel, transverse rods joined at their ends by slotted links which permit collapsing in a lateral plane or such parallel, transverse rods passing through slots in a mesh of some type such as an accordian-shaped metal or "flat-wire" structure. In any eevnt, the most effective of the collapsible type conveyor belts include parallel cross-rods and some form of link which will permit collapsing in a lateral plane to permit turning through a lateral bend. One such open type collapsible belt is shown and described in U.S. Patent 3,225,898.

Collapsible conveyor belts of the above type, of either the open type or the mesh type, may be utilized to convey materials where these materials are substantially immune to buffeting, scratching, or denting, but are not well suited for conveying packages, luggage or the like which can be readily marred by the metal belt. Further, in conveying packages, luggage or the like, such as in an aircraft terminal, good traction on the upper surface of the belt is highly desirable. Again, the previously described metal conveyor belts provide excellent traction either because of the mesh structure of the spaced, transverse rods of the open type structure, but, again, the very structure which provides traction also tends to mar or damage the items being transported. Accordingly, a number of cover plates for the above type belts have been proposed. These generally include a slat, which spans the space between two of the transverse rods, made of metal. However, the upper surface of these metal slats is generally smooth, thereby lacking proper traction, and there is a limit to how sharp a bend can be made in the lateral plane because of the manner of attaching the metal slats to the conveyor belt and the structure of the slats. Illustrative cover plates of this type may be found in U.S. Patents 2,621,779 and 3,045,809. There is therefore a need for an improved cover plate for this type of conveyor which gives positive traction while at the same time permitting tight turns in a lateral plane.

The above described conveyor belts, when utilized in a uniplanar or superposed run configurations, can best be driven by a driving mechanism located beneath the belt and which have belt-engaging means with projecting pusher elements which hook behind the transverse rods of the belt and push the belt forward. A suitable drive of this character is described in U.S. Patent 3,033,353. While this type of drive is suitable for use in some conveyor systems, it has been found that a closed loop uniplanar or superposed run configuration having lateral bends cannot be effectively driven thereby. A number of problems have been found to exist when a drive of the patented character is utilized in the closed loop system of the present invention. First of all, it has been found that a single drive mechanism cannot be utilized with spaced idler rollers, since there is a tendency for certain portions of the belt to run faster or slower than other portions. Accordingly, it has been found necessary to employ at least two drive means which are synchronized and therefore will automatically operate to take up excessive slack or relieve excessive tension at the particular drive location of interest. Further, the very nature of the collapsible belt causes numerous problems with respect to the individual drive mechanism at a given location. For example, it has been found that the tendency of the transverse rods to become askew relative to one another causes serious problems in a drive mechanism including pusher dogs which must hook behind the rods and push the belt forward. It has been found that if only one pusher element is driving the belt at all times, the next succeeding pusher dog will often have difficulty hooking behind the next succeeding rod sometimes missing the rod completely, becoming jammed ahead of the belt or lifting the belt off the drive. Accordingly, the belt will have tendency to come off the drive mechanism at frequent intervals. It has been found therefore that the drive mechanism must have at least two of the pusher elements in driving contact with appropriate transverse rods of the belt at all times and in order to positively engage and disengage the rods, the pusher elements must be turned into and out of contact with the rods through an arcuate path. Further, it has been found that the pusher elements cannot be in contact with the transverse length of the rod or at a substantial number of transversely-spaced points along the rod. Accordingly, a single, narrow contact or pusher element is necessary to prevent the same types of problems observed when only one transverse rod at a time is positively driven.

Summary of the invention

A conveyor system having a flat belt disposed in at least one horizontal plane with at least one lateral bend therein, and in which said belt comprises, a plurality of generally-parallel, transverse rods linked together in a manner to permit lateral collapsing and expansion of the edges of the belt as it goes through the lateral turn; a plurality of elongated slat-type surface elements having a forward surface in one horizontal plane and a rearward surface of essentially the same width as said forward surface in a second lower plane, whereby the slats will overlap one another and move with respect to one another in a lateral plane, and a snap-type, resilient, clamp depending from the lower surface of the trailing section of the slat and adapted to snap over corresponding ones of transverse rods of the belt; and a drive means positioned beneath the belt, including, a generally elliptically-mounted, closed loop roller chain, a plurality of driving dogs pivotally mounted on the chain at equally spaced points along the chain adjacent the leading end of the driving dog, cam rollers mounted adjacent the trailing end of the driving dog and on either side thereof, a narrow, upstanding pusher element extending upwardly from and adjacent the center of the driving dog, and a pair of generally-elliptical cams of essentially the configuration of the roller chain and adapted to have the cam rollers describe the outer edge of the elliptical cam as the chain moves forward, the upper portion of the cam having smooth, sharp rises adjacent and equally spaced from either end thereof, gradual, straight inclines leading from the sharp rises inwardly and a generally-horizontal middle portion, whereby cam rollers acting on the sharp rise and gradual inclines, adjacent the trailing end of the drive means cause the driving dog to rotate arcuately upwardly at first a rapid rate and then a more gradual rate and hook the pusher element behind one of the transverse rods and similarly to unhook the pusher element from the transverse rod, adjacent the leading end of the drive means and the cam rollers acting on the horizontal, intermediate portion of the cam cause at least two of the pusher elements to contact and drive at least two of the transverse rods at all times.

Brief description of the drawings

In accordance with the drawings.

FIGURE 4 is an enlarged cross-sectional view of a covering slat in accordance with the present invention;

FIGURE 5 is an isometric view, partially in section, showing the details of the driving mechanism of the present invention; and FIGURE 6 is a side view, somewhat idealized, showing the cam and follower system of the drive mechanism of FIGURE 5.

Description of the preferred embodiments

Figure 1:
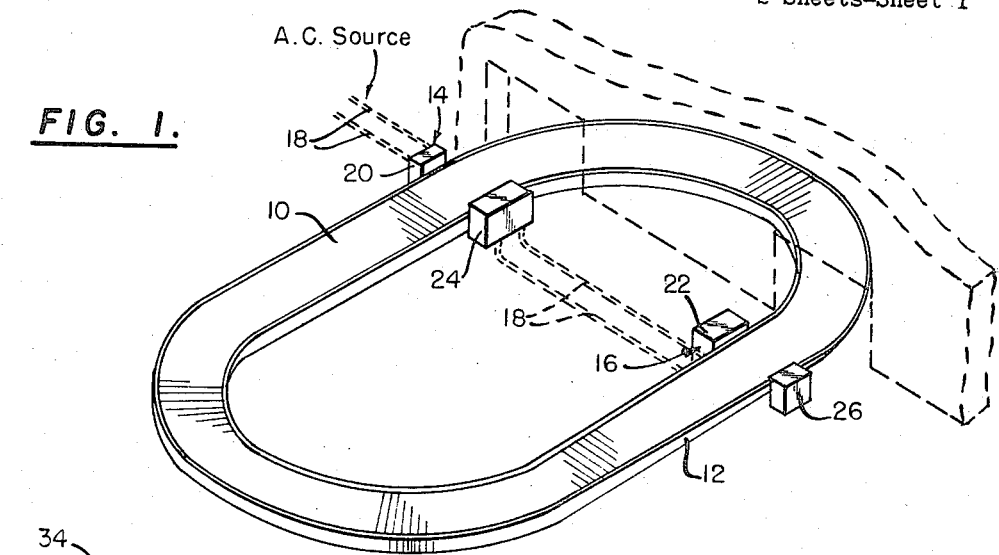
FIGURE 1 is an isometric view of an overall conveyor system, illustrating the general relationship of the major components of the system.

In accordance with FIGURE 1, a closed loop drive belt 10 is formed in a generally-elliptical, uniplanar configuration. As previously indicated, the drive belt may be formed in superposed runs or any other configuration involving at least one lateral bend or turn. Belt 10 is supported on and slideably mounted in support and guide track 12. The belt, in accordance with known construction, slides on suitable wear strips of low friction material, such as nylon, and upstanding side rails, with appropriate low friction strips maintain the belt in its desired configuration and yet permit ready movement of the belt, particularly through its turns. A plurality of driving units represented generally by driving units 14 and 16 are mounted along the track or frame 12. Drive units 14 and 16 should, as previously indicated, comprise at least two in number.

Preferably, each of the two driving units are spaced an equal distance from the other and each is located on a straight portion of the run just before the belt enters a turn or bend. At least two such drive units are necessary since the collapsible structure of the belt causes certain portion of the belt to run faster or slower than other portions. In addition, the drive units 14 and 16 should be electrically or otherwise synchronized so that at least one of the units is sensitive to excessive slack in the belt at the location of that particular drive unit or excessive tension on the belt at that particular drive location and will automatically speed up or slow down to compensate for such variations. One example of a system to accomplish this could be a servo system or any one of a number of systems for coordinating two drive units. This is illustrated generically in the drawing by the electrical lines 18 connecting units 14 and 16. The drive units 14 and 16 generally comprise a drive motor and control represented generically by large rectangular structures 20 and 22, respectively, and drive shaft supports on the opposite side represented by rectangular configurations 24 and 26, respectively, the drive mechanisms of the present invention being located beneath belt 10 midway between the sides of the belt.

Figure 2:
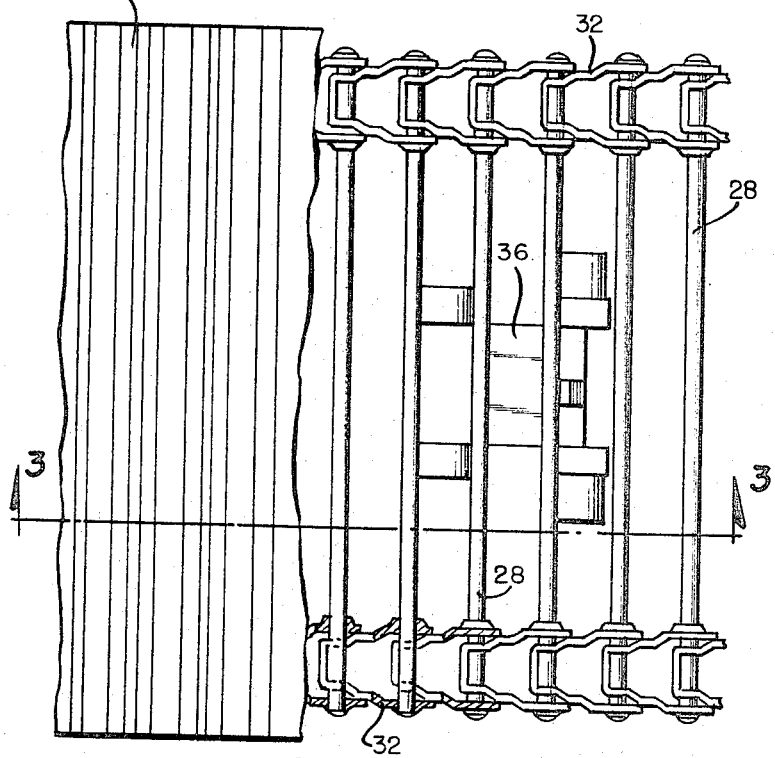
FIGURE 2 is a plan view of a conveyor belt for use in the present invention, together with the slat covering and the pusher dogs of the present invention.
Figure 3:
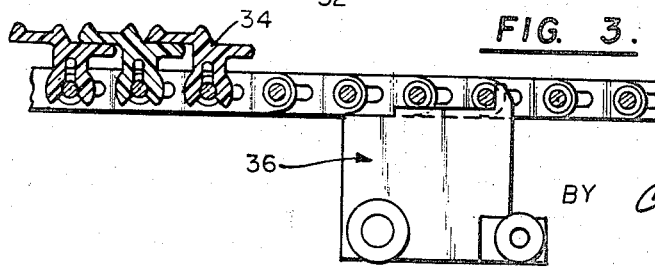
FIGURE 3 is a cross-sectional view taken along the line 3—3 of FIGURE 2.

As indicated previously, the belt, in accordance with the present invention includes a collapsible metal conveyor belt with a suitable slat-type covering and is driven by drive dog elements located beneath the belt. The details of such a belt in cooperation with the novel cover slats and drive dogs of the present invention are shown in FIGURES 2 and 3. In accordance with FIGURES 2 and 3, a plurality of generally parallel transverse rods 28 are held together by appropriate slotted links 30 and 32, respectively. As is obvious from FIGURES 2 and 3, the slotted links 30 and 32 permit the rods 28 to move closer together or further apart at either end, to thereby permit the belt to make a lateral bend or turn without vertical twisting of the belt. As previously indicated, the belt of FIGURES 2 and 3 or a belt having the spaces between links 30 and 32 filled by an appropriate mesh or the like, such as an accordian-shaped extension of essentially the same character as the links, can be utilized without a cover for conveying certain types of articles. However, in accordance with the present invention and irrespective of whether a mesh-type metal belt or an open-type belt, such as that shown, is utilized, a plurality of slats 34 cover the entire upper surface of the belt. The belt is driven from beneath by appropriate driving dog 36.

The novel slat covering of the present invention is shown in enlarged cross section in FIGURE 4 of the drawings. In a typical belt in accordance with the present invention, the cross-rods 28 will have a radius of about $3/16$ inch. Therefore, slat 34 has downwardly-depending resilient legs 38 and 40 which form an annular clamp with a $3/16$ inch internal radius. The lower portion of legs 38 and 40 has an opening smaller than the diameter of rods 28 so that legs 38 and 40 will spread apart to receive rods 28 and then snap about and clamp on the rods. In actual practice, the angle 42 between legs 38 and 40 is approximately 90 degrees. Above the central opening between legs 38 and 40 extending upwardly therefrom is a longitudinal channel or cut-out section 44. Extending across the top of legs 38 and 40 and extending to the rear of leg 38 on a first, or lower, horizontal plane is rearward or trailing portion 46 of the slat. As shown in the drawings, trailing portion 46 is flat on its upper surface, for reasons which will be pointed out hereinafter. Extending forwardly and on a second, or upper, horizontal plane is forward or leading portion 48 of the slat. Forward portion 48 of the slat has a flat, lower surface on essentially the same plane as the upper surface of trailing portion 46, so that the forward portion 48 of the one slat will overlap the rearward portion 46 of the preceding, adjacent slat. This overlapping will, of course, permit the slats a wide latitude of movement in a lateral plane without binding and without leaving open spaces for articles to become caught, while, at the same time, permitting as tight a turn as possible in the lateral bends of the belt. Formed along the edges of the upper surface of forward portion 48 are traction ribs 50 and 52, respectively, which give the slats suitable traction on the bottom of the object being moved. It will be quite obvious from an observation of FIGURE 4 that except for traction ribs 50 and 52 and general rounding of corners to reduce damage to articles being transported and/or adjacent slats, the entire cross-sectional configuration of slat 34 is of exactly the same thickness. This is made possible only by beginning forward portion 48 of the slat at a point adjacent the inner surface of leg 40 and by having slat 44 extending upwardly from the circular opening between legs 38 and 40. As previously indicated, the metallic covering plates of the prior art were found to have a number of disadvantages. Accordingly, the covering slats of the present invention are extruded plastic materials, and, preferably, an extruded modified polypropylene. It was found in accordance with the present invention that slats of substantial length, having appropriate strength and flexibility and minimum thickness could not be produced by extrusion of thermoplastic materials unless the configuration was such that substantially the same thickness existed at any cross-sectional location in the slat. If this uniform thickness was not maintained, it was found that, because of the length of the slats relative to their thickness, the extruded slats had a tendency to bow or bend in one direction or the other or in several directions depending upon the relative thickness or densities of plastic at any given cross-sectional location. By utilizing the novel uniform, cross-sectional structure of the present slat, it was found that perfectly straight extrusions of any practical length could be produced. In order to fit the metal belts of FIGURES 2 and 3 and accommodate the driving dogs of the drive mechanism, appropriate portions of legs 38 and 40 can be cut out at the necessary longitudinal points along the slats. However, it is obvious that no more of legs 38 and 40 should be removed than is necessary to serve these purposes.

The traction drive unit of the present invention is illustrated in FIGURES 5 and 6 of the drawings. For simplicity and clarification of the functions of the drive unit, the discussion will hereinafter refer to the left-hand end of FIGURE 5 as the trailing end or rear end of the drive unit and the right-hand end as the forward end or leading end of the drive unit. This designation, of course, relates to the direction in which the top run of drive unit is moving, namely, from left to right. The drive is generally made up of a rectangular frame structure about 26 inches in length, about 6 inches high and about 6 inches wide. End plates 54 and 56 close the ends of the rectangular frame. These end plates are preferably made of metal. Side plates 58 and 60 are also preferably made of metal. Coupled to the inside of side plates 58 and 60 are cam plates 62 and 64, respectively. Cam plates 62 and 64 are mirror images of one another and have formed therein an appropriate lower cam track 66 and a lower portion 68 of cam 70. Plates 62 and 64 are preferably made of plastic, which facilitates the formation of cam track 66 and portion 68 of cam 70. Since the plastic portions of cam 70 and cam track 66 are not subjected to any particular pressure, except the rolling contact of cam followers or rollers, as they follow the lower run of the chain, such plastic construction is convenient and economical. The upper portion 72 of cam 70 is preferably formed of metal, since there is a substantial amount of wear on this particular section of the cam and it is necessary that this section of the cam be critically formed. Accordingly, section 72 of cam 70 is made as a separate and replaceable element which may be readily replaced when it becomes worn, but, by the same token, it is made of a material which will not wear readily. Cam 70 is generally of an elliptical configuration, paralleling the eliptical form of the chain, with a flat bottom edge which together with plate 62 forms cam track or race 66. Each end of cam section 68 then blends at its top edge into horizontal portions 74–76 of cam section 72. These short, flat portions 74–76 of cam section 72 then rise sharply but smoothly upwardly as indicated by the curved portions 78–80. Thereafter, the surface follows gradually-inclined, straight portions 82–84 and finally, an intermediate horizontal portion 86 joins portions 82–84. The reasons for this particular configuration of section 72 of cam 70 will be discussed in detail later. A generally-flat, second cam 88 extends inwardly beyond the upper central portion thereof and is of approximately the same length as portion 86 of cam 70. The function of this cam will also be discussed in greater detail at a later point. Mounted adjacent the trailing end of the drive unit and passing through plates 58, 62, 60 and 64 is idler shaft 90. Idler shaft 90 protrudes beyond the outer surfaces of plates 58 and 60 and has an adjustment screw and nut assembly 92 mounted in each end. Adjustment screw and nut assemblies 92 permit longitudinal shifting of idler shaft 90 in either direction by appropriately tightening or loosening the adjustment nut. Mounted forwardly of shaft 90 on the exterior of plates 58 and 60 are chain adjustment blocks 94. Appropriate bolt and nut adjusting means 96 are threadably mounted through blocks 94 with the bolt bearing against shaft 90. Adjusting means 96, therefore, permits the adjustment of the tension on the drive chain 98. Drive chain 98 is preferably a #60, double roller chain having a ¾-inch pitch. The rearward or trailing end of the loop of chain 98 passes over an appropriate 13-tooth, double row #60 sprocket 104 having a ¾-inch pitch. This idler sprocket is, of course, rotatably mounted on idler shaft 90. Mounted adjacent the forward end of the drive mechanism and passing through appropriate bearings in plates 58, 62, 60 and 64 is drive shaft 102. Fixedly coupled to drive shaft 102 is a 13-tooth, double row #60, ¾-inch pitch drive sprocket 104, which supports and drives the forward loop of chain 98. One end 106 of the drive shaft 102 extends beyond plate 58 to be coupled to an appropriate drive motor (not shown). Mounted at equally-spaced internals on chain 98 are driving dogs 38. While FIGURE 5 shows only one driving dog, in the specific unit being described herein, 12 such driving dogs are provided. Driving dog 38 is mounted on chain 98 by spindle or connecting pin 108 which passes through either side of main frame 110 of driving dog 38 and through one of the links of chain 98. Thus connecting pin 108 forms a forward pivot for driving dog 38. Mounted on the free ends of connecting pin 108 are front cam followers or rollers 112. Cam followers or rollers 112 are rotatably mounted on spindle 108 so that they may roll with respect to frame 110 of driving dog 38. Mounted adjacent the trailing end of drive dog 38, and outwardly beyond the outer surface of front cam followers or rollers 112 are rear cam followers or rollers 114. Rollers 114 are, of course, also appropriately mounted to roll with respect to body portion 110 of driving dog 38. Protruding upwardly from the flat upper surface and intermediate the leading and trailing ends of drive dog 38 is pusher element 116. Pusher element 116 is designed and adapted to hook behind transverse rods 28 of the belt and drive the same, as generally-illustrated in FIGURES 2 and 3 of the drawings.

In operation of the drive unit of FIGURE 5, reference will be made to the idealized roller and cam illustration of FIGURE 6. In accordance with FIGURES 5 and 6, cam rollers 114 are sized and adapted to roll below cam section 68 of cam 70 within cam track 66 when the dogs are on the lower run of chain 98. During the lower run of the chain, this is the only connection between the driving dog and the cams. As a particular driving dog begins to leave track 66, roller 114 starts up the curved rise 78 of cam section 72. As the rollers 114 are ascending portion 78 of the cam, such ascension will tend to rapidly rock pusher element 116 in an arcuate path upwardly. This arcuate path due to the configurtaion of cam section 78, is substantially of the same curvature as the transverse rods 28 of the belt and at this time, the pusher elements 116 are slightly out of contact and behind the corresponding rod 28. The follower or roller 114 then ascends gradual incline 82 of cam section 72, which continues the arcuate movement of pusher elements 116 but at a much more gradual rate. Finally, follower 114 reaches the horizontal portion 86 of cam section 72 and the pusher element 116 is then in complete contact with the correspond transverse rod 28 and begins driving the belt forward. As previously indicated, section 86 of cam section 72 is flat and of sufficient length at least two drive dogs 38 are in driving relation with pusher elements 116 in contact with a corresponding cross-rod 28 of the belt at all times. It has been found that this drive by at least two drive dogs is necessary to the proper operation of the drive mechanism. The forward end of cam 70 is a mirror image of the rearward end and the camming action at that end is simply the reverse of that just described. In other words, as cam rollers 114 reach the forward end of straight section 86, they gradually begin to rock in an arcuate path downwardly and out of contact with transverse rods 28. Thereafter, as they reach curved section 80, they rock downwardly through the arcuate path much more rapidly until the pusher elements are completely out of contact and the rollers begin to enter cam track 66. Cam rollers 112 cooperate with cam 88 to hold pusher elements 116 in continuous contact with the corresponding transverse rods 28 while the drive dog is travelling along the straight portion 86 of cam 70 and also prevent the drive dogs and consequently the chain 98 from rising as a result of the tension applied thereto by the belt which is being driven.

I claim:

1. In a conveyor system having a flat belt disposed in at least one horizontal plane with at least one lateral bend therein, and in which said belt comprises, a plurality of generally-parallel, transverse rods linked together in a manner to permit lateral collapsing and expansion of the edges of the belt as it goes through said lateral turn, the improvement comprising; a plurality of elongated slat-type surface elements having a forward surface in one horizontal plane and a rearward surface of essentially the same width as said forward surface in a second lower plane, whereby said slats will overlap one another and move with respect to one another in a lateral plane, and a snap-type, resilient clamp depending from the lower surface of the trailing section of said slat and adapted to snap over corresponding ones of said transverse rods of said belt; and a drive means positioned beneath said belt, including, a generally eliptically-mounted, closed loop roller chain, a plurality of driving dogs pivotally mounted on said chain at equally spaced points along said chain adjacent the leading end of said driving dog, cam rollers mounted adjacent the trailing end of said driving dog and on either side thereof, a narrow, upstanding pusher element extending upwardly from and adjacent the center of said driving dog, and a pair of generally-elliptical cams of essentially the configuration of said roller chain and adapted to have said cam rollers describe the outer edge of said elliptical cam as said chain moves forward, the upper portion of said cam having smooth, sharp rises adjacent and equally spaced from either end thereof, gradual, straight inclines leading from said sharp rises inwardly and a generally-horizontal middle portion, whereby said cam rollers acting on said sharp rise and said gradual inclines adjacent the trailing end of said drive means cause said driving dog to rotate arcuately upwardly at first a rapid rate and then a more gradual rate and hook said pusher element behind one of said transverse rods.

2. A system in accordance with claim 1 wherein the slats are extruded, thermoplastic elements, having substantially the same cross-sectional thickness in all areas thereof.

3. A system in accordance with claim 1 wherein the spacing of the drivng dogs and the length of the generally-horizontal, middle portion of the cams are dimensioned so that the cam rollers acting on said horizontal, middle portion of said cams cause at least two of the pusher elements to contact and drive at least two of the transverse rods at all times.

4. A system in accordance with claim 1 wherein a second pair of cam rollers is mounted on and adapted to roll on the pivot of the driving dogs on either side of said driving dogs and a second pair of straight cams are horizontally mounted above said second cam rollers and is substantially the same length as the horizontal, middle portion of the first cams, whereby said second cam rollers acting on said second cams maintain said driving dogs in a substantially horizontal plane as the first cam rollers are acting on said horizontal, middle portion of said first cam.

5. Cover plate means for a flat belt having a plurality of generally-parallel, transverse rods linked together in a manner to permit lateral collapsing and expansion of the edges of the belt as it goes through a lateral turn, comprising a plurality of elongated, slat-type, extruded thermoplastic surface elements having a forward surface in one horizontal plane and a rearward surface of essentially the same width as said forward surface in a second lower plane, whereby said slats will overlap one another and move with respect to one another in a lateral plane, and a snap-type, resilient clamp formed adjacent the leading edge of the trailing portion of the slat and depending from the lower surface thereof of said slat and adapted to snap over the corresponding ones of said transverse rods of said belt, having substantially the same cross-sectional thickness in all areas thereof.

6. A cover plate means in accordance with claim 5 wherein longitudinal upstanding traction ribs are formed at the front and rear of the upper surface of the forward surface of the slats.

7. Drive means for a flat conveyor belt having a plurality of generally-parallel, transverse rods linked together at spaced intervals, comprising a generally, elliptically-mounted, closed loop roller chain; a plurality of driving dogs pivotally mounted on said chain at equally spaced points along said chain adjacent the leading end of said driving dog, a pair of cam rollers mounted adjacent the trailing end of said driving dog and on either side thereof; a narrow, upstanding pusher element extending upwardly from and adjacent the center of said driving dog; and a pair of generally-elliptical cams of essentially the configuration of said roller chain and adapted to have said cam rollers describe the outer edge of said elliptical cam as said chain moves forward; the upper portion of said cam having smooth, sharp rises adjacent and equally spaced from either end thereof, gradual, straight inclines leading from said sharp rises inwardly and a generally horizontal middle portion, whereby said cam rollers acting on said sharp rise and said gradual inclines adjacent the trailing end of said drive means cause said driving dog to rotate arcuately upwardly at first a rapid rate and then a more gradual rate and hook said pusher element behind one of said transverse rods.

8. A system in accordance with claim 7 wherein the spacing of the driving dogs and the length of the generally-horizontal, middle portion of the cams are dimensioned so that the cam rollers acting on said horizontal, middle portion of said cams cause at least two of the pusher elements to contact and drive at least two of the transverse rods at all times.

9. A system in accordance with claim 7 wherein a second pair of cam rollers is mounted on and adapted to roll on the pivot of the driving dogs on either side of said driving dogs and a second pair of straight cams are horizontally mounted above said second cam rollers and are substantially the same length as the horizontal, middle portion of the first cams, whereby said second cam rollers acting on said second cams maintain said driving dogs in a substantially horizontal plane as the first cam rollers are acting on said horizontal, middle portion of said first cams.

References Cited

UNITED STATES PATENTS

| 1,731,609 | 10/1929 | Brayton | 198—195 |
| 1,903,488 | 4/1933 | Stibbs. | |
| 2,609,086 | 9/1952 | McBride et al. | 198—203 |
| 2,954,113 | 9/1960 | Hibbard et al. | 198—189 |
| 3,033,353 | 5/1962 | Burnett et al. | 198—203 |
| 3,265,193 | 8/1966 | Bessant | 198—182 |
| 3,333,678 | 8/1967 | Rodman | 198—181 |

RICHARD E. AEGERTER, *Primary Examiner.*

R. J. HICKEY, *Assistant Examiner.*

U.S. Cl. X.R.

198—195, 203